United States Patent [19]
Carlson

[11] 3,840,266
[45] Oct. 8, 1974

[54] ELASTIC SEAL
[76] Inventor: Gilbert F. Carlson, 5225 N. Lakeland Ave., Minneapolis, Minn. 55429
[22] Filed: May 4, 1973
[21] Appl. No.: 357,161

[52] U.S. Cl. ........ 296/23 MC, 52/173 DS, 161/167, 161/102, 161/406 R
[51] Int. Cl. ............................................. B60p 3/32
[58] Field of Search .............. 296/23 R, 23 MC, 99; 49/475; 52/173 DS, 398, 403, 716, 717; 161/167, 102, 406 R; 280/403

[56] References Cited
UNITED STATES PATENTS

| | | | |
|---|---|---|---|
| 2,247,340 | 6/1941 | Webster | 296/23 R X |
| 2,736,675 | 2/1956 | Pehrson | 161/102 X |
| 3,041,682 | 7/1962 | Alderfer et al. | 49/475 |
| 3,121,649 | 2/1964 | Oliver | 161/102 |
| 3,508,786 | 4/1970 | Colville | 296/99 |
| 3,586,119 | 6/1971 | Chuchua et al. | 296/23 MC X |
| 3,613,324 | 10/1971 | Conger | 52/173 DS |
| 3,625,560 | 12/1971 | Bjork | 296/23 MC |
| 3,729,879 | 5/1973 | Franklin | 161/406 X |

Primary Examiner—Robert J. Spar
Assistant Examiner—Leslie J. Paperner
Attorney, Agent, or Firm—Merchant, Gould, Smith & Edell

[57] ABSTRACT

A sealing device between adjacent walls of a vehicle cab and a camper body mounted on the vehicle, to permit generally aligned windows of the vehicle cab and front wall of the camper body to be open and to prevent entry of dust, moisture and other foreign matter to the interior of the vehicle cab and camper body. A loop of compressible elastic material is disposed to encompass the cab and camper windows and has opposite front and rear sides engaging the adjacent wall. An elongated adhesive tape is disposed to releasably hold the loop in place.

3 Claims, 4 Drawing Figures

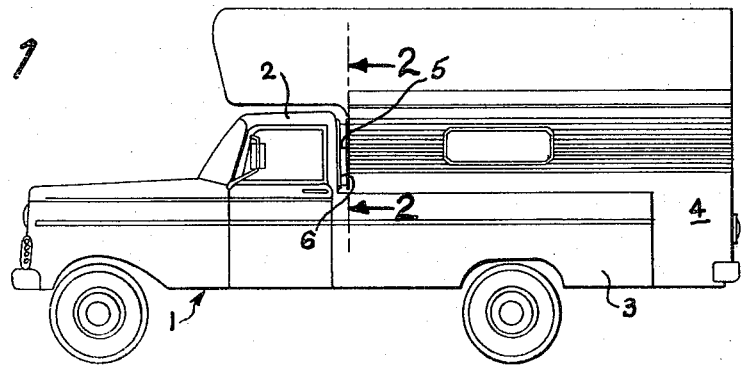
FIG. 1
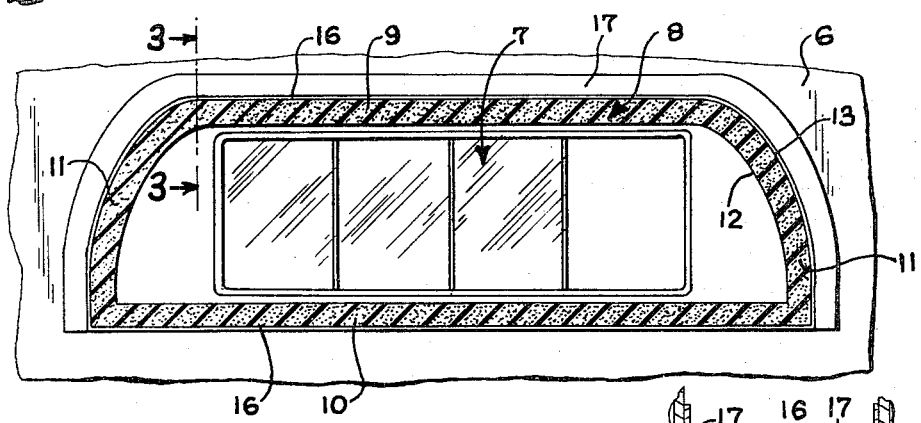
FIG. 2
FIG. 3
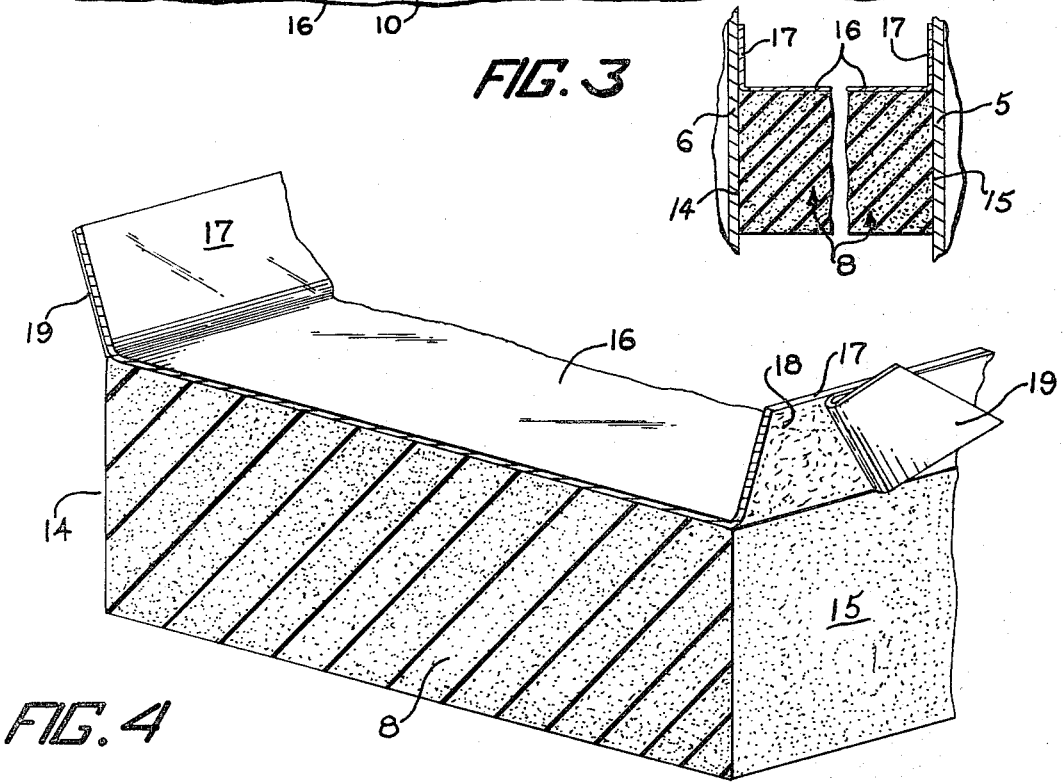
FIG. 4

ELASTIC SEAL

SUMMARY OF THE INVENTION

An important object of this invention is the provision of a sealing device which can be quickly and easily applied to adjacent generally parallel walls of an automotive vehicle cab and a camper body mounted thereon and around communicating windows in the cab and camper body, to seal the walls around the windows against entry of foreign material, such as dust or moisture.

Another object of this invention is the provision of a sealing device which is effective in preventing loss of heated or cooled air passing through the communicating windows from one of the cab or camper to the other one thereof.

Still another object of this invention is the provision of a sealing device which is relatively inexpensive to manufacture and which is adapted for use with vehicle cabs and camper bodies of various brands of manufacture.

To these ends, I provide a sealing body of compressible elastic material formed to provide a loop of a size and shape to freely encompass the adjoining windows in the rear wall of a vehicle, such as a pickup truck, and in the front wall of a camper body mounted on the vehicle. The sealing body has inner and outer peripheral surfaces and opposite generally flat front and rear surfaces, the front surface being adapted to be disposed in face-to-face engagement with the rear wall of the cab, the rear surface being disposable in face-to-face engagement with the front wall of the camper body. A moisture proof flexible elastic tape extends along and is bonded to the outer peripheral surface of the sealing body and extends transversely outwardly from the front and rear surfaces of the body to provide flanges for anchoring and sealing the body in place on the adjacent walls of the vehicle cab and camper body.

DESCRIPTION OF THE DRAWINGS

FIG. 1 is a view in side elevation of a pick-up truck and camper body mounted thereon, with the elastic seal of this invention mounted in place between the truck cab and the camper body;

FIG. 2 is an enlarged fragmentary section taken substantially on the line 2—2 of FIG. 1;

FIG. 3 is a still further enlarged fragmentary section taken substantially on the line 3—3 of FIG. 2; and FIG. 4 is a fragmentary perspective of a portion of the elastic seal of this invention.

DETAILED DESCRIPTION OF THE PREFERRED EMBODIMENT

In FIG. 1, a conventional automotive vehicle, commonly known as a pick-up truck is indicated generally at 1, the body of the truck including a cab 2 and an open-topped load carrying box 3 rearwardly of the cab 2. A conventional camper body 4 is mounted in the box 3 in the usual manner, the camper body 4 having a front wall 5 disposed closely adjacent and substantially parallel to the rear wall 6 of the cab 2. In FIG. 2, the rear wall 6 of the cab 2 is shown as being provided with a window 7 which may be assumed to be substantially in alignment or register with another window, not shown, in the front wall 5 of the camper body 4. The camper body 4 is of the type used in converting a pick-up truck to a recreational vehicle, and may be assumed to be provided with the usual door for entering the body and the usual furnishings for living in the interior of the body 4. The camper body 4 in and of itself, does not comprise the instant invention. Hence, further detailed showing and description thereof is omitted, in the interest of brevity.

The elastic seal of this invention comprises a sealing body 8 formed to provide an elongated closed loop having generally vertically spaced top and bottom portions 9 and 10 respectively and laterally spaced side portions 11. As shown, the sealing body 9 defines inner and outer peripheral surfaces 12 and 13 respectively and generally flat front and rear surfaces 14 and 15 that are adapted to be disposed in face-to-face engagement with the cab wall 6 and front camper body wall 5. The sealing body 8 is made from flexible or elastic and compressible material such as foam rubber or foam plastic. The sealing body 8 is of such width between the front and rear surfaces 14 and 15 thereof that the body is under compression when the same is mounted on the walls 5 and 6 with the camper body 4 properly positioned in the truck box 3.

An elongated mounting and sealing tape 16 is adhered to the outer peripheral surface 13 of the sealing body 8, the same being shown as extending about the entire outer peripheral surface of the body 8. Adjacent the top portion 9 and side portions 11, the tape 16 is of substantially greater width than the dimension of the sealing body 8 between the front and rear surfaces 14 and 15 thereof, to provide laterally outwardly projecting mounting flanges 17. The inner surfaces of the flanges 17 are coated with pressure sensitive adhesive, indicated at 18 in FIG. 4, one of the flanges 17 therein shown as being so coated. The adhesive coating 18 on each flange 17 is normally covered by protective tape 19 that is removed when the sealing body 8 is mounted between the vehicle cab 2 and front wall 5 of the camper body 4. Preferably, the entire inner surface of the tape 16 is coated with the adhesive coating 18, and the sealing body 8 is adhered to the tape 16 between the flanges 17 thereof by means of the adhesive coating.

When it is desired to mount the sealing body 8 in place, the camper body 4 is moved rearwardly relative to the vehicle 1 to enable a person to work between the walls 5 and 6. The protective tape 19 is then removed from the flange portion 17 adjacent the front surface 14, and the sealing body 8 is mounted on the rear wall 6 of the cab 2, the adjacent flange 17 being folded outwardly and stretched to lie flat against the rear wall 6. The adjacent flange 17 is pressed into tight sealing engagement with the rear wall 6 along the full lengths of the top and side body portions 9 and 11. The camper body 4 is then moved forwardly in the box 3 until the front wall 5 thereof is disposed in face-to-face abutting engagement with the rear surface 15 of the body 8. The adjacent flange 17 is manipulated to be disposed against the front wall 5 laterally outwardly of the body 8, the protective strip removed, and the adjacent flange 17 pressed into sealing engagement with the front wall 5. Easy access is had to the flange 17 adjacent the camper body wall 5 at the top portion 9 and opposite side portions 11, and pressing the rear flange 17 into sealing engagement with the camper body wall 5 may be done without difficulty. When both flanges 17 have been adhered to their respective walls 5 and 6, the camper body 4 is moved further forwardly to laterally compress the body 8 between the walls 5 and 6, thereby insuring a tight sealing contact of the surfaces 14 and 15 against the walls 6 and 5 respectively. The camper body 4 is locked in place by the usual means, not shown. Sealing of the flanges 17 against the walls 6 and 5 of the cab and camper body respectively, and compression of the body 8 assures sealing of the interior of the body 8 against entry of moisture and dust from the exterior thereof. The body 8 is of sufficient thickness between its front and rear surfaces 14 and 15 to provide adequate sealing between camper bodies and truck cabs having different dimensions between the cabs and camper body walls, and wherein a variation of such dimension occurs over the areas of the cab and camper walls, such as when one wall slopes or curves relative to the other thereof.

With the body 8 mounted between the cab 2 and front wall 5, the window 7 of the vehicle cab 2 and the adjoining window of the front wall may be kept open as desired, for exchange of air between the interior of the cab 2 and that of the camper body 4. Further, active surveillance of children in the camper body or conversation between persons in the cab and camper body may be had at all times without being affected by rain, outside dust or other exterior weather conditions.

When it is desired to remove the camper body from the vehicle, it is only necessary to unlock the camper body 4 from the vehicle and move the body 4 rearwardly to enable the front flange 17 to be peeled away from engagement with the rear wall 6 of the cab 2. The camper body 4 is then removed from the vehicle and the protective coating 19 re-applied to the front flange 17. If desired, the body 8 may remain adhered to the front wall 5 of the camper body 4.

While I have shown and described a commercial embodiment of my flexible seal, it will be understood that the same is capable of modification without departure from the spirit and scope of the invention, as defined in the claims.

What is claimed is:

1. An elastic seal comprising a sealing body of elastic compressible material in the form of a loop having spaced top and bottom portions and laterally spaced side portions, said sealing body having inner and outer peripheral surfaces and opposite generally flat front and rear surfaces for face-to-face engagement with respective adjacent surfaces of a vehicle cab rear wall and the front wall of a camper body mounted on the vehicle rearwardly of the cab, said loop being of a size to encompass and be disposed laterally outwardly of generally aligned windows in said cab surface and said front wall, and means for securing said sealing body to said cab and camper wall including flexible mounting flanges secured to said outer peripheral surface and projecting outwardly from said front and rear surfaces, said flanges having adhesive coatings for engagement with said adjacent cab and camper wall surfaces laterally outwardly of at least the top and side portions of said body.

2. The elastic seal defined in claim 1 in which said means comprises a length of tape of flexible moisture proof material adhered to the outer peripheral surfaces of at least the top and side portions of said body, said tape having opposite longitudinal edge portions projecting outwardly beyond said front and rear surfaces to provide said flanges.

3. The elastic seal defined in claim 2 in which said tape material is elastic, said flanges being normally disposed in planes normal to the planes of said front and rear surfaces of the body and being capable of being stretched to be disposed in the planes of said front and rear surfaces when adhered to the cab and said front camper wall.

* * * * *